(12) United States Patent
Hu et al.

(10) Patent No.: US 11,782,332 B2
(45) Date of Patent: Oct. 10, 2023

(54) LASER LIGHT SOURCE SYSTEM OF MODULAR HIGH-EFFICIENCY HEAT-DISSIPATION UNIFORM FIELD

(71) Applicant: JINMEI LASERTEC CORP., LTD, Shanxi (CN)

(72) Inventors: Yuanyuan Hu, Shanxi (CN); Haiyang Chen, Shanxi (CN); Hui Li, Shanxi (CN); Xinyu Yan, Shanxi (CN); Xiangyu Ji, Shanxi (CN)

(73) Assignee: JINMEI LASERTEC CORP., LTD, Shanxi (CN)

( * ) Notice: Subject to any disclaimer, the term of this patent is extended or adjusted under 35 U.S.C. 154(b) by 51 days.

(21) Appl. No.: 17/418,058

(22) PCT Filed: Oct. 10, 2020

(86) PCT No.: PCT/CN2020/120178
§ 371 (c)(1),
(2) Date: Jun. 24, 2021

(87) PCT Pub. No.: WO2021/068936
PCT Pub. Date: Apr. 15, 2021

(65) Prior Publication Data
US 2022/0269154 A1    Aug. 25, 2022

(30) Foreign Application Priority Data
Oct. 11, 2019    (CN) .......................... 201910960761.4

(51) Int. Cl.
*G03B 21/16*    (2006.01)
*G03B 21/20*    (2006.01)

(52) U.S. Cl.
CPC ........... *G03B 21/16* (2013.01); *G03B 21/204* (2013.01); *G03B 21/208* (2013.01)

(58) Field of Classification Search
None
See application file for complete search history.

(56) References Cited

U.S. PATENT DOCUMENTS

2020/0333697 A1* 10/2020 Tanaka ............... G03B 21/2066

FOREIGN PATENT DOCUMENTS

| CN | 101267087 A | 9/2008 |
|---|---|---|
| CN | 104122742 A | 10/2014 |

(Continued)

OTHER PUBLICATIONS

International Search Report issued for PCT/CN2020/120178 filed on Oct. 10, 2020.

*Primary Examiner* — Bao-Luan Q Le
*Assistant Examiner* — Danell L Owens
(74) *Attorney, Agent, or Firm* — Hunton Andrews Kurth LLP

(57) ABSTRACT

An exemplary laser light source system of a modular high-efficiency heat-dissipation uniform field is described. The light beam emitted by the blue laser light source is incident to the reflecting-blue transmitting-yellow beam combining mirror after passing through the scattering plate, and then is incident to the fluorescent unit through the lens group. The light beam generated after the excitation of the fluorescent unit is incident to the light pipe through the lens group I, the reflecting-blue transmitting-yellow beam combining mirror, the reflecting-red transmitting-blue-green beam combining mirror and the lens group II in sequence. The laser light source system of a modular high-efficiency heat-dissipation uniform field can effectively dissipate the heat generated by the laser, and obtain uniform picture projection output at the same time, which has a good practical application value.

8 Claims, 3 Drawing Sheets

(56) References Cited

FOREIGN PATENT DOCUMENTS

| CN | 102645833 A | 1/2016 |
| CN | 105264437 A | 1/2016 |
| CN | 209182644 U | 7/2019 |
| CN | 110632816 A | 12/2019 |

* cited by examiner

LASER LIGHT SOURCE SYSTEM OF MODULAR HIGH-EFFICIENCY HEAT-DISSIPATION UNIFORM FIELD

CROSS REFERENCE TO RELATED APPLICATION(S)

This application claims priority from the Chinese patent application filed in China National Intellectual Property Administration on Oct. 11, 2019 having the Application NO. 201910960761.4 and entitled as "Laser Light Source System Of Modular High-Efficiency Heat-Dissipation Uniform Field", the entire content of which is incorporated in this application by reference.

TECHNICAL FIELD

The present disclosure relates to the technical field of laser projection, in particular to a laser light source system of a modular high-efficiency heat-dissipation uniform field.

BACKGROUND ART

Laser projection, as the most advanced projection technology at present, has developed rapidly in recent years, forming three main product forms: pure laser light source, laser fluorescent wheel and laser LED light source, among which the laser projector with fluorescent powder is the most cost-effective projector. Laser fluorescence projection irradiates fluorescent powder with blue laser to produce yellow light, which performs wavelength combination with another part of blue laser which transmits an optical path, thus greatly reducing the coherence of light source and effectively eliminating speckle. However, laser irradiation at a high lumen or for a long time on the fluorescent wheel will cause the local temperature of fluorescent powder to be very high, resulting in the decrease of fluorescent efficiency, which makes it difficult to make a high-brightness projector. Thus, a laser fluorescence plus pure laser light source system is produced, which not only has the characteristics of laser fluorescence without speckle, but also has the characteristics of projection output of high brightness, high definition and wide color gamut of pure laser, and can truly reproduce the rich and gorgeous colors of the objective world.

In the pure laser light source used in a projector, the speckle effect and non-uniformity of the laser projection picture will be caused because the laser has very strong coherence and high monochromaticity. At the same time, the power and wavelength of laser will fluctuate with the change of ambient temperature. The electro-optical conversion efficiency of pure laser light source is generally only 13%-40%, and the rest of the electric energy generates heat, so that the heat dissipation of a laser is particularly important. In traditional laser heat dissipation, the laser is fixed on the heat sink, and heat-conducting silicone grease is coated between the laser and the heat sink. When using a high-power laser, it is difficult to control the temperature of the laser within the nominal working temperature range.

The high coherence of a semiconductor RGB laser diode will lead to the speckle effect and non-uniformity of laser projection display, and the change of the working temperature will affect the wavelength and power of a laser, so that the homogenization of a laser projection system and the heat dissipation of a laser are particularly important.

SUMMARY

In view of the above, the present disclosure provides a laser light source system of a modular high-efficiency heat-dissipation uniform field. In this scheme, the laser temperature is controlled within the nominal working temperature range by improving the laser heat dissipation structure and adding the vibration scattering plate structure to the laser optical path, and a speckle-free uniform projection picture is obtained at the same time, thus solving the problems of laser heat dissipation and non-uniform projection picture.

To achieve the above purpose, the present disclosure provides the following scheme.

A laser light source system of a modular high-efficiency heat-dissipation uniform field is provided, comprising a blue laser light source I, a scattering plate I, a reflecting-blue transmitting-yellow beam combining mirror, a reflecting-red transmitting-blue-green beam combining mirror, a lens group I, a fluorescent unit, an RGB laser light source, a vibration scattering plate, a lens I, a lens group II, and a light pipe;

wherein the light beam emitted by the blue laser light source I is incident to the reflecting-blue transmitting-yellow beam combining mirror after passing through the scattering plate I, and then is incident to the fluorescent unit through the lens group I;

the light beam generated after the excitation of the fluorescent unit is incident to the light pipe through the lens group I, the reflecting-blue transmitting-yellow beam combining mirror, the reflecting-red transmitting-blue-green beam combining mirror and the lens group II in sequence;

the light beam emitted by the RGB laser light source is incident to the light pipe through the vibration scattering plate, the lens, the reflecting-red transmitting-blue-green beam combining mirror and the lens group II in sequence.

Preferably, the RGB laser light source comprises a blue laser light source, a green laser light source and a red laser light source, the blue laser light source, the green laser light source and the red laser light source are welded on a water cooling plate through indium-tin alloy welding plates, respectively, the light beam emitted by the blue laser light source is emitted through a reflector, a reflecting-green transmitting-blue beam combining mirror, a reflecting-red transmitting-blue-green beam combining mirror, and a lens in sequence, the light beam emitted by the green laser light source is emitted through the reflecting-green transmitting-blue beam combining mirror, the reflecting-red transmitting-blue-green beam combining mirror and the lens in sequence, and the light beam emitted by the red laser light source is emitted through the reflecting-red transmitting-blue-green beam combining mirror and the lens.

According to the laser light source system of a modular high-efficiency heat-dissipation uniform field provided by the present disclosure, a mixed light source in which a laser fluorescent wheel is added in a pure laser is adopted, which is coupled into a light pipe in a wavelength combining mode. A vibration scattering plate device is added in the pure laser optical path, so that a speckle-free uniform picture projection output is obtained. At the same time, the heat dissipation structure of the laser is optimized, and the laser is welded on the heat sink through the indium-tin alloy welding plate with higher thermal conductivity. The thermal conductivity of the indium-tin alloy is more than 5 times that of heat-conducting silicone grease, which can effectively dissipate the heat generated by the laser, control the temperature within the working temperature range of the laser and prolong the life of the laser.

According to the specific embodiment provided by the present disclosure, the present disclosure discloses the following technical effects.

(1) It is difficult to control the temperature of a high-power laser in the working temperature range by coating heat-conducting silicone grease traditionally, and the thermal conductivity of indium-tin alloy is more than 5 times that of heat-conducting silicone grease. Using indium-tin alloy welding plate to weld the laser on the water cooling plate can fix the laser more firmly on the water cooling plate and control the temperature in the nominal working temperature range.

(2) Through the implementation of the scheme of the present disclosure, the vibration scattering plate device is added in the optical path of the semiconductor RGB laser. The mode of performing wavelength combination with the fluorescence excitation light generated by the fluorescence unit can realize the speckle-free uniform picture display and greatly improve the viewing experience.

The present disclosure is reasonable in design. A novel optical path using the beam combining mirror is designed. A semiconductor RGB laser diode and a laser fluorescent unit are coupled and integrated. The heat dissipation structure of the laser is optimized, and a vibration scattering plate device is added in the RGB laser path at the same time, so that a laser light source system of a modular high-efficiency heat-dissipation uniform field is realized. The laser light source system of a modular high-efficiency heat-dissipation uniform field can effectively dissipate the heat generated by the laser, and obtain uniform picture projection output at the same time, which has a good practical application value.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

Figure 1:
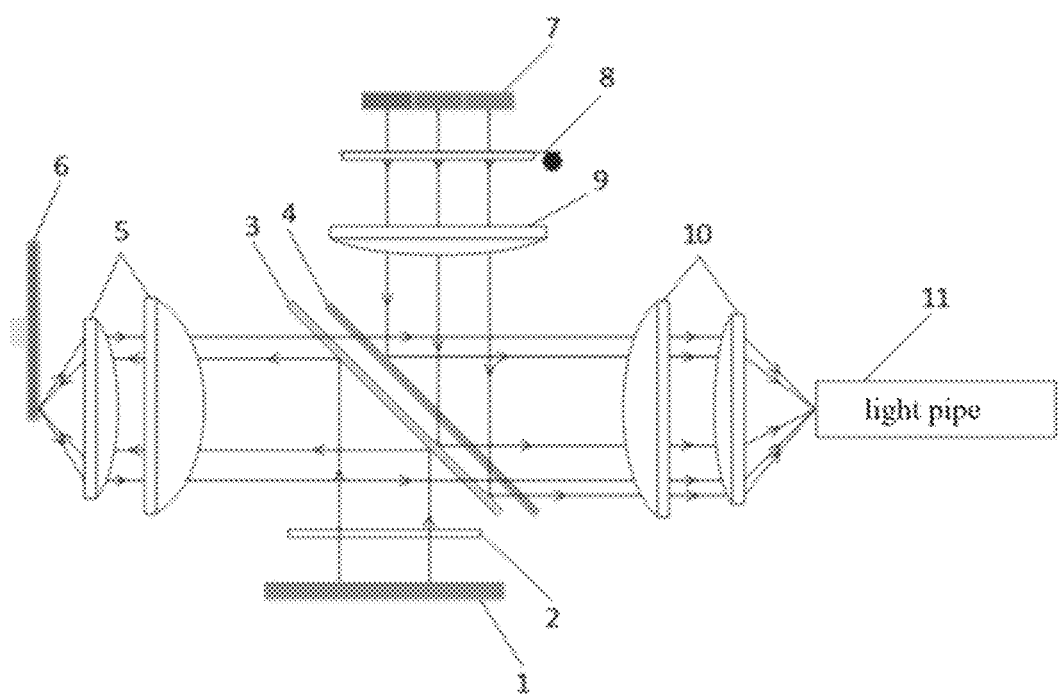
FIG. 1 shows a structural schematic diagram of a laser light source system of a modular high-efficiency heat-dissipation uniform field.

In the drawings: 1—blue laser light source I, 2—scattering plate I, 3—reflecting-blue transmitting-yellow beam combining mirror, 4—reflecting-red transmitting-blue-green beam combining mirror, 5—lens group I, 6—fluorescence unit, 7—RGB laser light source, 8—vibration scattering plate, 9—lens I, 10—lens group II, 11—light pipe; 701—water cooling plate, 702—indium-tin alloy welding plate, 703—blue laser light source, 704—green laser light source, 705—red laser light source, 706—reflector, 707—reflecting-green transmitting-blue beam combining mirror, 708—reflecting-red transmitting-blue-green beam combining mirror, 709—lens; 801—scattering plate support, 802—scattering plate, 803—vibration motor, 801—driver.

DETAILED DESCRIPTION OF THE EMBODIMENTS

The technical scheme in the embodiments of the present disclosure will be described clearly and completely hereinafter with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The purpose of the present disclosure is to provide a laser light source system of a modular high-efficiency heat-dissipation uniform field, which solves the problems of laser heat dissipation and non-uniform projection picture.

In order to make the above objects, features and advantages of the present disclosure more obvious and understandable, the present disclosure will be further explained in detail hereinafter with reference to the drawings and specific embodiments.

As shown in FIG. 1, a laser light source system of a modular high-efficiency heat-dissipation uniform field comprises a blue laser light source I 1, a scattering plate I 2, a reflecting-blue transmitting-yellow beam combining mirror 3, a reflecting-red transmitting-blue-green beam combining mirror 4, a lens group I 5, a fluorescent unit 6, an RGB laser light source 7, a vibration scattering plate 8, a lens I 9, a lens group II 10, and a light pipe 11.

As shown in FIG. 1, the light beam emitted by the blue laser light source I 1 is incident to the reflecting-blue transmitting-yellow beam combining mirror 3 after passing through the scattering plate I 2, and then is incident to the fluorescent unit 6 through the lens group I 5. The light emitted by the blue laser light source 1 transmits through the reflecting-blue transmitting-yellow beam combining mirror 3 via the scattering plate 12, reaches the lens group 15, and is focused to the fluorescent material of the fluorescent unit 6.

Figure 4:
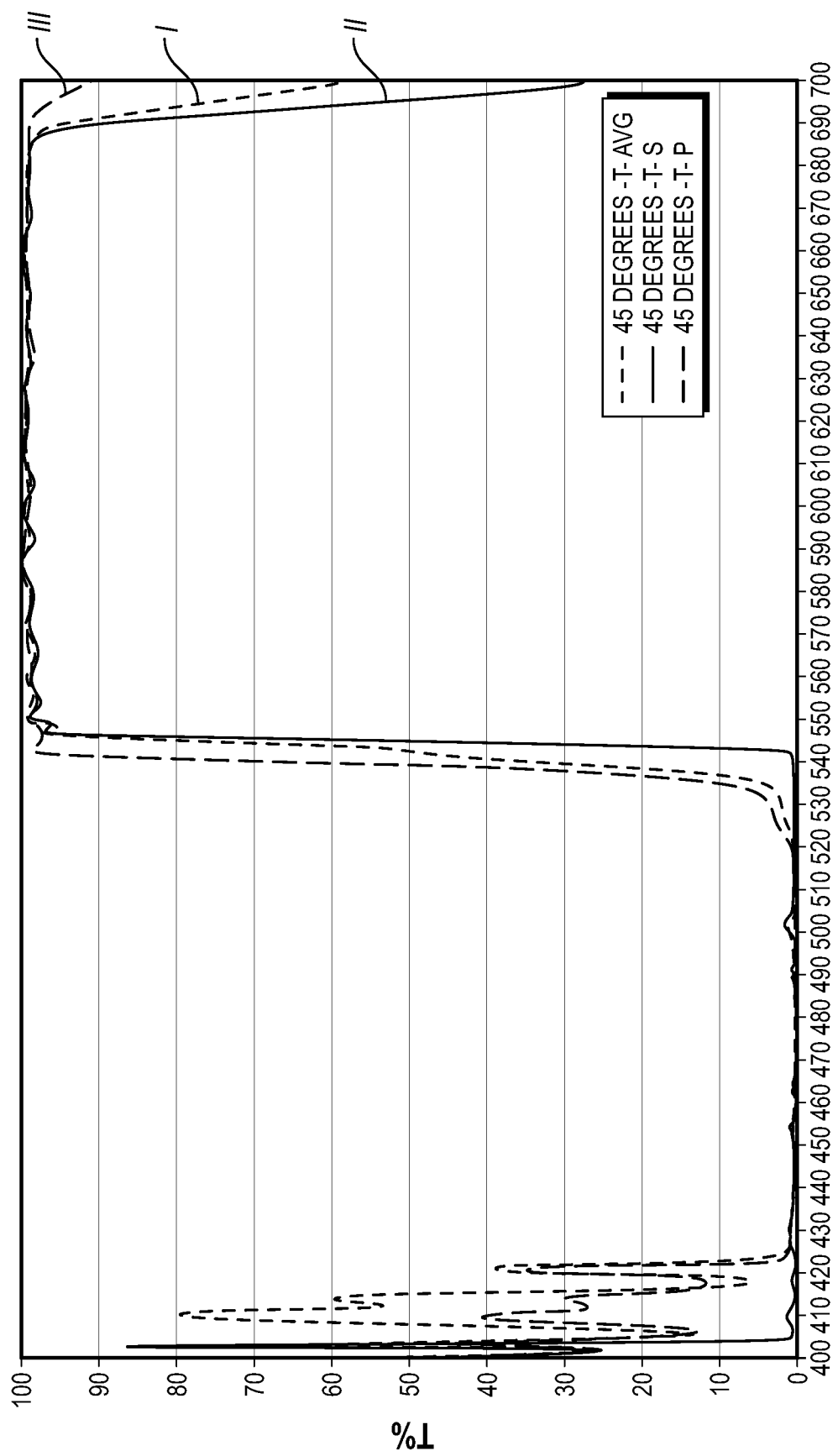
FIG. 4 shows optical characteristics of a reflecting-blue transmitting-yellow beam combining mirror.

The reflecting-blue transmitting-yellow beam combining mirror 3 has the light transmission characteristics shown in FIG. 4. When the reflecting-blue transmitting-yellow beam combining mirror 3 is incident at an angle of 45 degrees, the average transmittance of 440-530 nm color light is less than 2%, and the average transmittance of 540-680 nm color light is greater than 95%.

As shown in FIG. 1, the light beam (yellow light) generated after the excitation of the fluorescent unit 6 is incident to the light pipe 11 through the lens group I 5, the reflecting-blue transmitting-yellow beam combining mirror 3, the reflecting-red transmitting-blue-green beam combining mirror 4 and the lens group II 10 in sequence. Then, the blue light source focused on the fluorescent unit 6 excites the fluorescent material to generate yellow light, which is emitted in parallel to the reflecting-blue transmitting-yellow beam combining mirror 3 through the lens group 5 and transmitted to the reflecting-red transmitting-blue-green beam combining mirror 4.

As shown in FIG. 1, the light beam emitted by the RGB laser light source 7 is incident to the light pipe 11 through the vibration scattering plate 8, the lens I 9, the reflecting-red transmitting-blue-green beam combining mirror 4 and the lens group II 10 in sequence. The light emitted by the RGB laser light source transmits through the lens I 9 via the vibration scattering plate 8, reaching the reflecting-red transmitting-blue-green beam combining mirror 4. Blue laser in the RGB laser light source is reflected by the beam combining mirror 4. The red-green laser transmits through and is reflected by the beam combining mirror 4 and the beam combining mirror 3, which performing multi-wavelength combination with the fluorescence excitation light generated by the fluorescence unit. The laser light source transmitting through the reflecting-red transmitting-blue-green beam combining mirror 4 enters the lens group II 10 in parallel, focusing on and coupling into the light pipe 11.

Figure 2:
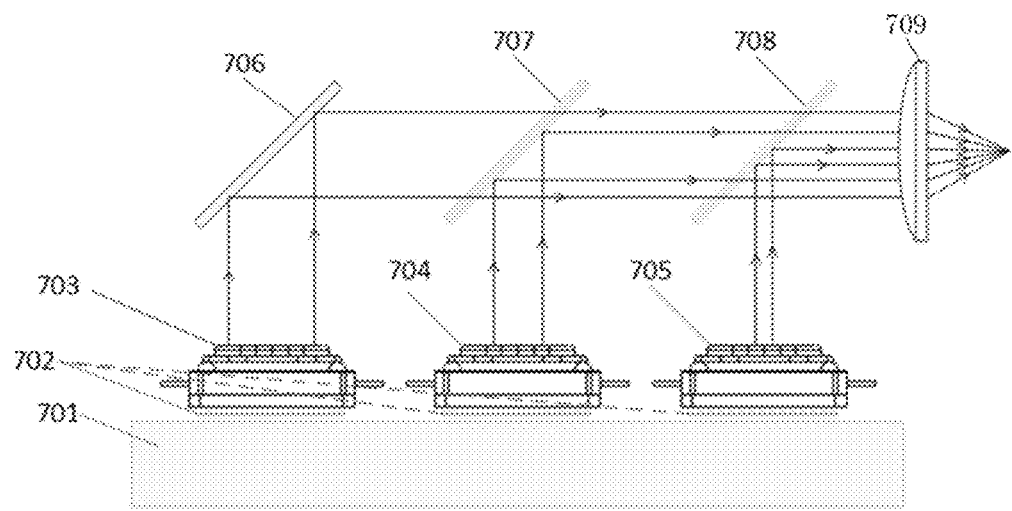
FIG. 2 shows an RGB laser light source and a heat dissipation structure.

As shown in FIG. 2, the RGB laser light source 7 dissipates heat and is emitted to the vibration scattering plate through the following structure, comprising a blue laser light source 703, a green laser light source 704 and a red laser light source 705. The blue laser light source 703, the green laser light source 704 and the red laser light source 705 are welded on a water cooling plate 701 through indium-tin alloy welding plates 702, respectively. The light beam emitted by the blue laser light source 703 is emitted through a reflector 706, a reflecting-green transmitting-blue beam combining mirror 707, a reflecting-red transmitting-blue-green beam combining mirror 708, and a lens 709 in sequence. The light beam emitted by the green laser light source 704 is emitted through the reflecting-green transmitting-blue beam combining mirror 707, the reflecting-red transmitting-blue-green beam combining mirror 708 and the lens 709 in sequence. The light beam emitted by the red laser light source 705 is emitted through the reflecting-red transmitting-blue-green beam combining mirror 708 and the lens 709. Then, the RGB laser light source is directly welded on the water cooling plate 701 through the indium-tin alloy welding plate 702. The water channel of the water cooling plate is externally connected with a fan or a water cooling mechanism for cooling. The laser light emitted by the blue laser light source 703 is reflected by the reflector 706 to the reflecting-green transmitting-blue beam combining mirror 707. The green laser light source 704 performs wavelength combination with the blue laser through the reflecting-green transmitting-blue beam combining mirror 707. The red laser light source 708 performs multi-wavelength combination with the blue laser and the green laser through the reflecting-red transmitting-blue-green combining mirror 708, and enters the lens 709 to converge and exit.

Figure 3:
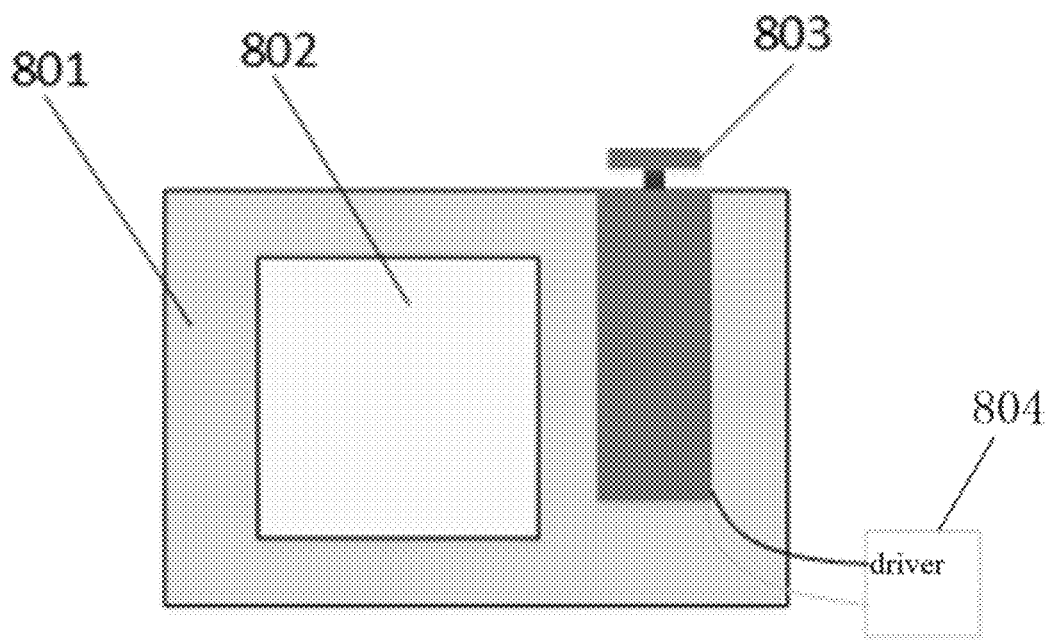
FIG. 3 shows a structural schematic diagram of a vibration scattering plate.

As shown in FIG. 3, the vibration scattering plate 8 comprises a scattering plate support 801, a scattering plate 802 and a vibration motor 803 are mounted the scattering plate support 801, and the vibration motor 803 is externally connected with a driver 804.

In practice, the beams transmitted or reflected by the beam combining mirror are incident at an angle of 45 degrees. The wavelengths of semiconductor RGB laser diodes are 455 nm, 465 nm, 520 nm, 525 nm, 638 nm and 642 nm, respectively. Through the novel optical path, the multi-wavelength light source combination is performed using a beam combining mirror, and a vibration scattering device is added to the semiconductor RGB laser path, so that a speckle-free uniform projection picture can be obtained, thus realizing a laser light source system with high brightness, high cost performance, no speckle and stable performance.

In this specification, each embodiment is described in a progressive manner, and each embodiment focuses on the differences from other embodiments. It is sufficient to refer to the same and similar parts among each embodiment.

In the present disclosure, a specific example is applied to illustrate the principle and implementation of the present disclosure, and the explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:

1. A laser light source system of a modular high-efficiency heat-dissipation uniform field, comprising:
    a blue laser light source I, a scattering plate I, a reflecting-blue transmitting-yellow beam combining mirror, a reflecting-red transmitting-blue-green beam combining mirror, a lens group I, a fluorescent unit, an RGB laser light source, a vibration scattering plate, a lens I, a lens group II, and a light pipe;
    wherein:
    a light beam emitted by the blue laser light source I is incident to the reflecting-blue transmitting-yellow beam combining mirror after passing through the scattering plate I, and then is incident to the fluorescent unit through the lens group I;
    a light beam generated after an excitation of the fluorescent unit is incident to the light pipe through the lens group I, the reflecting-blue transmitting-yellow beam combining mirror, the reflecting-red transmitting-blue-green beam combining mirror and the lens group II in sequence; and
    a light beam emitted by the RGB laser light source is incident to the light pipe through the vibration scattering plate, the lens I, the reflecting-red transmitting-blue-green beam combining mirror and the lens group II in sequence.

2. The laser light source system of a modular high-efficiency heat-dissipation uniform field according to claim 1, wherein the RGB laser light source comprises a blue laser light source, a green laser light source and a red laser light source, the blue laser light source, the green laser light source and the red laser light source are welded on a water cooling plate through indium-tin alloy welding plates, respectively, the light beam emitted by the blue laser light source is emitted through a reflector, a reflecting-green transmitting-blue beam combining mirror, a reflecting-red transmitting-blue-green beam combining mirror, and a lens in sequence, the light beam emitted by the green laser light source is emitted through the reflecting-green transmitting-blue beam combining mirror, the reflecting-red transmitting-blue-green beam combining mirror and the lens in sequence, and the light beam emitted by the red laser light source is emitted through the reflecting-red transmitting-blue-green beam combining mirror and the lens.

3. The laser light source system of a modular high-efficiency heat-dissipation uniform field according to claim 1, wherein the vibration scattering plate comprises a scattering plate support, a scattering plate and a vibration motor are mounted the scattering plate support, and the vibration motor is externally connected with a driver.

4. The laser light source system of a modular high-efficiency heat-dissipation uniform field according to claim 2, wherein the vibration scattering plate comprises a scattering plate support, a scattering plate and a vibration motor are mounted the scattering plate support, and the vibration motor is externally connected with a driver.

5. The laser light source system of a modular high-efficiency heat-dissipation uniform field according to claim 3, wherein the beams transmitted or reflected by the beam combining mirror are incident at an angle of 45 degrees.

6. The laser light source system of a modular high-efficiency heat-dissipation uniform field according to claim 4, wherein the beams transmitted or reflected by the beam combining mirror are incident at an angle of 45 degrees.

7. The laser light source system of a modular high-efficiency heat-dissipation uniform field according to claim 5, wherein light transmission characteristics of the reflecting-blue transmitting-yellow beam combining mirror are as follows: when the reflecting-blue transmitting-yellow beam combining mirror is incident at an angle of 45 degrees, the average transmittance of 440-530 nm color light is less than 2%, and the average transmittance of 540-680 nm color light is greater than 95%.

8. The laser light source system of a modular high-efficiency heat-dissipation uniform field according to claim 6, wherein light transmission characteristics of the reflecting-blue transmitting-yellow beam combining mirror are as follows: when the reflecting-blue transmitting-yellow beam combining mirror is incident at an angle of 45 degrees, the average transmittance of 440-530 nm color light is less than 2%, and the average transmittance of 540-680 nm color light is greater than 95%.

* * * * *